United States Patent
Puente Pestaña et al.

(10) Patent No.: US 11,438,464 B2
(45) Date of Patent: Sep. 6, 2022

(54) METHOD OF REPORTING TRAFFIC METRICS BY A USER PLANE FUNCTION, UPF, TO A SESSION MANAGEMENT FUNCTION, SMF, IN A TELECOMMUNICATION NETWORK, AS WELL AS A CORRESPONDING UPF

(71) Applicant: Telefonaktiebolaget LM Ericsson (publ), Stockholm (SE)

(72) Inventors: Miguel Angel Puente Pestaña, Madrid (ES); Carlos Jimenez Cordon, Madrid (ES); Miguel Angel Muñoz De La Torre Alonso, Madrid (ES); Veronica Sanchez Vega, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 68 days.

(21) Appl. No.: 17/255,667

(22) PCT Filed: Aug. 23, 2018

(86) PCT No.: PCT/EP2018/072742
§ 371 (c)(1),
(2) Date: Dec. 23, 2020

(87) PCT Pub. No.: WO2020/001795
PCT Pub. Date: Jan. 2, 2020

(65) Prior Publication Data
US 2021/0297535 A1 Sep. 23, 2021

(30) Foreign Application Priority Data

Jun. 25, 2018 (EP) .................................... 18382471

(51) Int. Cl.
*H04L 43/08* (2022.01)
*H04M 15/00* (2006.01)
(Continued)

(52) U.S. Cl.
CPC ........ *H04M 15/66* (2013.01); *H04L 12/1407* (2013.01); *H04L 41/0893* (2013.01);
(Continued)

(58) Field of Classification Search
None
See application file for complete search history.

(56) References Cited

U.S. PATENT DOCUMENTS

2018/0139107 A1* 5/2018 Senarath ............... H04L 45/302
2018/0199398 A1* 7/2018 Dao ..................... H04L 41/5041
2019/0335002 A1* 10/2019 Bogineni ................ H04L 45/64

OTHER PUBLICATIONS

Author Unknown, "Technical Specification Group Services and System Aspects; System Architecure for the 5G System; Stage 2 (Release 15)," Technical Specification 23.501, Version 15.1.0, 3GPP Organizational Partners, Mar. 2018, 201 pages.
(Continued)

*Primary Examiner* — Ajit Patel
(74) *Attorney, Agent, or Firm* — Withrow & Terranova, PLLC

(57) ABSTRACT

A method of reporting traffic metrics by a User Plane Function, UPF, to a Session Management Function, SMF, in a telecommunication network, wherein said method comprises the steps of receiving, by said UPF, a session creation/modification message for creating/modifying a session between said UPF and said SMF, wherein said message comprises a Reporting Rule thereby defining which traffic metric is to be reported by said UPF to said SMF, measuring, by said UPF, said traffic metric based on said received Reporting Rule, transmitting, by said UPF, to said SMF, a reporting message, wherein said reporting message comprises said measured traffic metric.

11 Claims, 3 Drawing Sheets

(51) Int. Cl.
  *H04L 12/14* (2006.01)
  *H04L 41/0893* (2022.01)
  *H04L 41/5067* (2022.01)
  *H04L 43/062* (2022.01)
  *H04W 4/24* (2018.01)

(52) U.S. Cl.
  CPC ........ *H04L 41/5067* (2013.01); *H04L 43/062* (2013.01); *H04L 43/08* (2013.01); *H04M 15/62* (2013.01); *H04M 15/852* (2013.01); *H04W 4/24* (2013.01)

(56) References Cited

OTHER PUBLICATIONS

Author Unknown, "Technical Specification Group Core Network and Terminals; Interface between the Control Plane and the User Plane Nodes; Stage 3 (Release 15)," Technical Specification 29.244, Version 15.0.0, 3GPP Organizational Partners, Dec. 2017, 157 pages.

Huawei, et al., "S2-186280: Update of N4 Parameter Descriptions and Tables," Third Generation Partnership Project (3GPP), TSG-SA2 Meeting #127 Bis, May 28-Jun. 1, 2018, 9 pages, Newport Beach, USA.

Samsung, et al., "S2-178012: TS 23.502: N4 session management for SMF and UPF interactions," Third Generation Partnership Project (3GPP), SA WG2 Meeting #123, Oct. 23-27, 2017, 5 pages, Ljubljana, Slovenia.

International Search Report and Written Opinion for International Patent Application No. PCT/EP2018/072742, dated Feb. 15, 2019, 10 pages.

International Preliminary Report on Patentability for International Patent Application No. PCT/EP2018/072742, dated Sep. 25, 2020, 17 pages.

\* cited by examiner

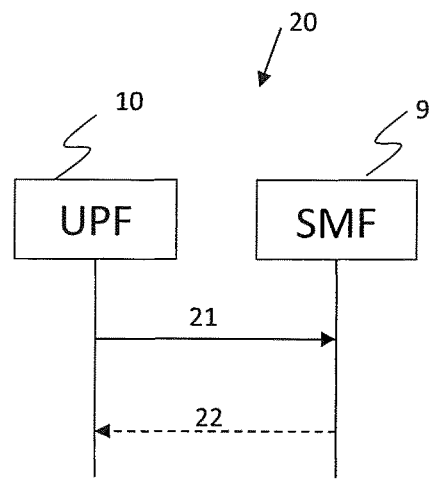
Fig. 2
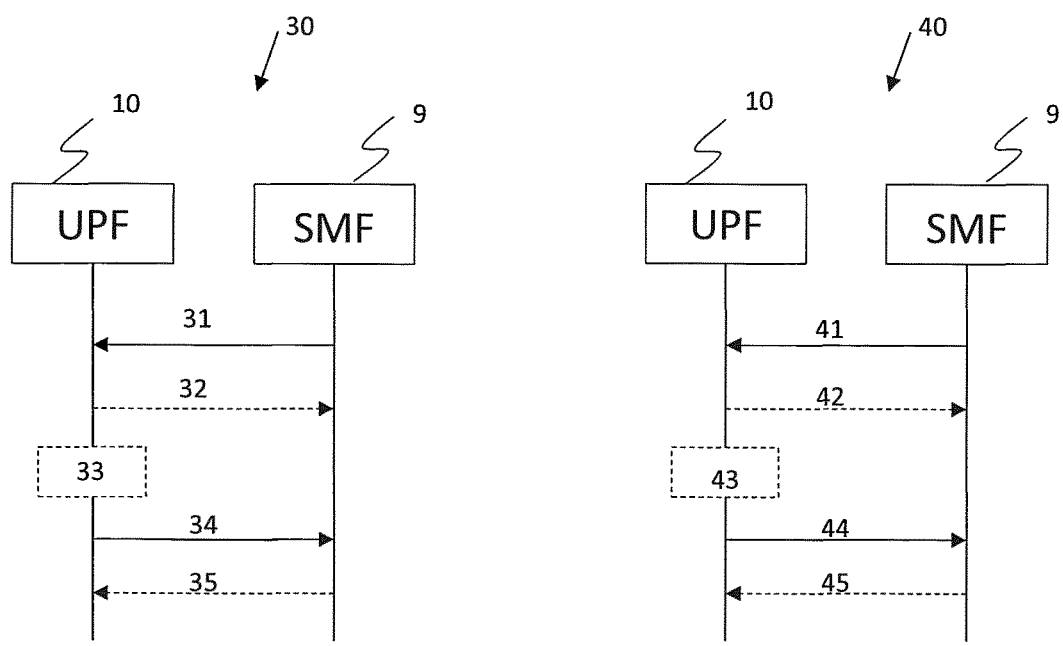
Fig. 3
Fig. 4

METHOD OF REPORTING TRAFFIC METRICS BY A USER PLANE FUNCTION, UPF, TO A SESSION MANAGEMENT FUNCTION, SMF, IN A TELECOMMUNICATION NETWORK, AS WELL AS A CORRESPONDING UPF

This application is a 35 U.S.C. § 371 national phase filing of International Application No. PCT/EP2018/072742, filed Aug. 23, 2018, which claims the benefit of European Patent Application No. 18382471.3, filed Jun. 25, 2018, the disclosures of which are incorporated herein by reference in their entireties.

TECHNICAL FIELD

The present disclosure relates to the reporting of traffic metrics and, more specifically, to the reporting of traffic metrics by the UPF to the SMF.

BACKGROUND

Control and user plane separation, CUPS, enables a flexible placement of the separated control plane and user plane functions for supporting diverse deployment scenarios such as a central or a distributed User Plane Function, UPF.

In The Fifth Generation, 5G, telecommunication network, CUPS refers to Session Management Function, SMF, and UPF network functions and to the N4 reference point between them, which is based on Packet Forwarding Control Protocol, PFCP.

The SMF controls the packet processing in the UPF by establishing, modifying or deleting PFCP Session contexts and by adding, modifying or deleting Packet Detection Rules, PDRs, Forwarding Action Rules, FARs, Quality of service Enforcement Rules, QERs, Usage Reporting Rules, URRs, and/or Buffering Action Rule, BAR, per PFCP session context, whereby an PFCP session context may correspond to an individual PDU session or a standalone PFCP session not tied to any PDU session.

Each PDR contains a Packet Data Inspection, PDI, that are one or more match fields against which incoming packets are matched, and may be associated to the following rules providing the set of instructions to apply to packets matching the PDI:
  one FAR, which contains instructions related to the processing of the packets, specifically forward, duplicate, drop or buffer the packet with or without notifying the CP function about the arrival of a DL packet
  zero, one, or more QERs, which contains instructions related to the QoS enforcement of the traffic;
  zero, one, or more URRs, which contains instructions related to traffic measurement and reporting.

The Network Data Analytics Function, NWDAF, is a new Network Function being standardized by the Third Generation Partnership Project, 3GPP, in 5G. NWDAF represents operator managed network analytics logical function. NWDAF provides slice specific network data analytics to the Policy Control Function, PCF, and Network Slice Selection Function, NSSF. NWDAF provides network data analytics such as load level information to the PCF and NSSF on a network slice level and the NWDAF is not required to be aware of the current subscribers using the slice. NWDAF notifies or publishes slice specific network status analytic information to the PCF(s) and NSSF that are subscribed to it. PCF(s) and NSSF can collect directly slice specific network status analytic information from NWDAF. This information is not subscriber specific. PCF uses that data in its policy decisions. NSSF may use the load level information provided by NWDAF for slice selection.

In the current PFCP reporting solution SMF configures PDRs associated to URRs in UPF. When a packet matches a PDR, the reporting actions configured in the associated URRs are executed. The current reporting solution in PFCP is used for charging, so the metric defined in URR is traffic volume. It is reported along with the reporting time or event (for time and event-based charging). As mentioned, the 5G Core network, 5GC, introduces a new function for analytics, NWDAF, that collects data from the NFs. So far, the standard specifies that NWDAF provides load analytics, so for the moment there is a requirement for UPF to provide load metrics. But standardization has just started and NWDAF will incorporate further analytics in the future. It is foreseen, by the inventors, that NWDAF will provide analytics as well taking user plane traffic metrics such as service flow metadata, network metrics, service QoE indicators, as input. As UPF is an important source of such user plane metrics, UPF shall be able to send these traffic metrics to SMF, and then SMF relies them to NWDAF. Such traffic measurements may also be consumed by other network functions such as PCF to enforce certain policies in real time.

In 5GC, the N4 interface between SMF and UPF will be based on the PCFP protocol. The current PFCP definition only allows to report volume from UPF to SMF. This is, according to the inventors, not enough to support the analytics use cases that will take place in 5G, where metrics such as data session, packet latency, jitter will be required to UPF. Packet latency may be defined as the mean, maximum access or Internet Round Trip Time during a transport connection time.

The current Policy and Charging Control, PCC, architecture in 3GPP networks allows the operator to enforce a certain QoS both on a per user and on a per service/application basis. However, enforcing the QoS in the network does not directly map to a good/bad quality as perceived from end user perspective. This concept is called end user QoE, Quality of Experience, as opposed to network QoS. There is no current mechanism in 3GPP PCC architecture that monitors and guarantees a certain end user QoE. It is even foreseen, by the inventors, that in 5G, the QoE metric will need to be reported to the UPF.

SUMMARY

An object of the present disclosure is to allow reporting, by a User Plane Function, of any traffic metric in a telecommunication network to a Session Management Function, SMF.

An object of the invention according to the present disclosure is to allow network operators to guarantee a certain Quality of Experience, QoE to the end users.

In a first aspect of the present disclosure, there is presented, a method of reporting traffic metrics by a User Plane Function, UPF, to a Session Management Function, SMF, in a telecommunication network. The method comprises the steps of receiving, by said UPF, a session creation/modification message for creating/modifying a session between said UPF and said SMF, wherein said message comprises a Reporting Rule thereby defining which traffic metric is to be reported by said UPF to said SMF, measuring, by said UPF, said traffic metric based on said received Reporting Rule, and transmitting, by said UPF, to said SMF, a reporting message, wherein said reporting message comprises said measured traffic metric.

The solution allows the UPF to report to SMF any traffic metric that can be used for analytics in the Fifth Generation Core, 5GC, Network. The existing mechanism to report UPF capabilities is extended with a new capability which includes the metric measurements. This would allow the SMF to know which UPFs support this capability and this can influence on UPF selection. The proposed solution allows interoperability between different network vendors as it may be based on Packet Forwarding Control Protocol, PFCP, extensions.

It is an advantage of the present disclosure that the Reporting Rule is received, by the UPF, in a session creation or a session modification message. In this case, it is not necessary to use standalone, i.e. separate, messages for conveying the Reporting Rule. There is no additional load on the capacity of the network, by using already existing messages in the network.

The above thus allows for an efficient way of informing the UPF to measure any traffic metric, and to report the measured traffic metric back to the SMF.

It is noted that a plurality of UPF's may be instructed, by a single SMF, to measure a particular traffic metric, and to report the measured traffic metric back to the SMF. As such, a single particular SMF is arranged to manage a plurality of SMF's.

According to an example, the step of receiving comprises receiving, by said UPF, said creation/modification message, wherein said message comprises a reporting trigger, wherein said reporting trigger indicates a trigger for reporting said measured traffic. In this example, the step of transmitting comprises transmitting, by said UPF, to said SMF, said reporting message triggered by said reporting trigger.

It may be advantageous to include a trigger in the creation/modification message which provides a trigger definition to report the measured traffic. Upon the occurrence of such a trigger, the UPF provides the measured metrics to the SMF. The trigger may, for example, define that the reporting is to be periodic or when a metric reaches a specific threshold.

Another advantage of the above is that network capacity is not utilized for messages that are not required. The SMF indicates to the UPF when it desires to received the measured traffic metric using the reporting trigger. As such, the UPF transmits the reporting message only when such a reporting trigger actually occurs.

In an example, the step of receiving comprises receiving, by said UPF, said creation/modification message, wherein said message comprises any of an Analytics Reporting Rule, ARR, for indicating traffic metric to be reported by said UPF on a Packet Detection Rule, PDR, level, a Session Analytics Reporting Rule, SARR, for indicating traffic to be reported by said UPF on a session level, or a Node Analytics Reporting Rule, NARR, for indicating traffic metric to be reported by said UPF on a node level.

The ARR defines traffic metrics that UPF shall report to the SMF. Rach ARR comprises an ARR-Identifier, ID, identifying the ARR, a list of traffic metric IDs, which define the traffic metric that shall be reported to the SMF. It may be beneficial when the UPF and the SMF shall have a common understanding of the metric-IDs. Similarly, the SARR comprises an SARR-ID and al list of traffic metric IDs, which define the traffic metric to be reported to the SMF.

The inventors have found that a reporting rule may be defined for specific applications. For example an ARR defines a traffic metric to be reported on a PDR level, a SARR defines traffic to be reported on a session level, and a NARR defines traffic metric to be reported on a node level. This aids the UPF in performing a correct measurement, i.e. a measurement which is actually requested by the SMF.

According to an example, the reporting message comprises any of a reporting rule identification for identifying wherein said reporting message is associated with one of said ARR, SARR and NARR, a metric identification for identifying said traffic metric, and a traffic metric value for identifying a measured traffic value of said traffic metric.

The advantage of the above described example is that only three fields are required in the reporting message for correctly reporting a particular traffic metric. It is a convenient and adequate way of reporting the measured traffic metric.

In an example, the method comprises the steps of transmitting, by said UPF, to said SMF, a session association setup request message, wherein said session association setup request message comprises a traffic metric capability identification for identifying capability for reporting said traffic metric, and receiving, by said UPF, from said SMF, an acknowledgement message thereby acknowledging said session association setup request message.

According to an example of the first aspect of the present disclosure, the session is a Packet Forwarding Control Protocol, PFCP, session.

In an example, the UPF comprises an N4 interface.

In a second aspect of the present disclosure, there is presented a User Plane Function, UPF, arranged for reporting traffic metrics to a Session Management Function, SMF, in a telecommunication network. The UPF comprises of a receive equipment arranged for receiving a session creation/modification message for creating/modifying a session between said UPF and said SMF, wherein said message comprises a Reporting Rule thereby defining which traffic metric is to be reported by said UPF to said SMF, a measure equipment arranged for measuring said traffic metric based on said received Reporting Rule, and transmit equipment arranged for transmitting to said SMF, a reporting message, wherein said reporting message comprises said measured traffic metric.

The advantages of the first aspect of the disclosure being a method of reporting traffic metrics by a UPF to an SMF, are also inherently a part of the second aspect of the disclosure. Furthermore, it is pointed out that although the claims read as if all the modules/equipments according to this second aspect of the present disclosure are incorporated into a single node, a person skilled in the art understands that the same disclosure could be implemented by, for example, distributing each of the modules over several nodes. Alternately, the disclosure could also be purely implemented in the cloud, whereby none of the physical nodes possess any of these modules/equipments as such.

According to an example of the second aspect of the disclosure, the receive equipment is further arranged for receiving said creation/modification message, wherein said message comprises a reporting trigger, wherein said reporting trigger indicates a trigger for reporting said measured traffic, and wherein said transmit equipment is further arranged for transmitting, to said SMF, said reporting message triggered by said reporting trigger.

In an example of the second aspect of the present disclosure, the receive equipment is further arranged for receiving said creation/modification message, wherein said message comprises any of an Analytics Reporting Rule, ARR, for indicating traffic metric to be reported by said UPF on a Packet Detection Rule, PDR, level, a Session Analytics Reporting Rule, SARR, for indicating traffic to be reported by said UPF on a session level, and/or a Node Analytics Reporting Rule, NARR, for indicating traffic metric to be reported by said UPF on a node level.

According to an example of the second aspect, the reporting message comprises any of a reporting rule identification for identifying wherein said reporting message is associated with one of said ARR, SARR and NARR, a metric identification for identifying said traffic metric, and/or a traffic metric value for identifying a measured traffic value of said traffic metric.

A UPF in accordance with any of the claims 8-10, wherein said transmit equipment is further arranged for transmitting, to said SMF, a session association setup request message, wherein said session association setup request message comprises a traffic metric capability identification for identifying capability for reporting said traffic metric, and wherein said receive equipment is further arranged for receiving, from said SMF, an acknowledgement message thereby acknowledging said session association setup request message.

In a further example of the second aspect of the present disclosure, the session is a Packet Forwarding Control Protocol, PFCP, session.

In an example according to the second aspect of the disclosure, the UPF comprises an N4 interface.

According to a third aspect of the present disclosure, there is presented a computer program product comprising a computer readable medium having instructions which, when executed by a User Plane Function, UPF, in a telecommunication network, cause said UPF to implement any of the methods as explained above.

In this aspect of the disclosure, a computer readable storage medium is provided with instructions that enable a system onto which said storage medium has been loaded to perform the method according to the present disclosure.

The above mentioned and other features and advantages of the disclosure will be best understood from the following description referring to the attached drawings. In the drawings, like reference numerals denote identical parts or parts performing an identical or comparable function or operation.

BRIEF DESCRIPTION OF THE DRAWINGS

FIG. 2 schematically illustrates a method of reporting User Plane Function, UPF, capabilities to a Session Management Function, SMF according to the present disclosure.

FIG. 3 schematically illustrates a method of reporting analytics according to the present disclosure.

FIG. 4 schematically illustrates a method of reporting analytics according to the present disclosure.

DETAILED DESCRIPTION

Figure 1:
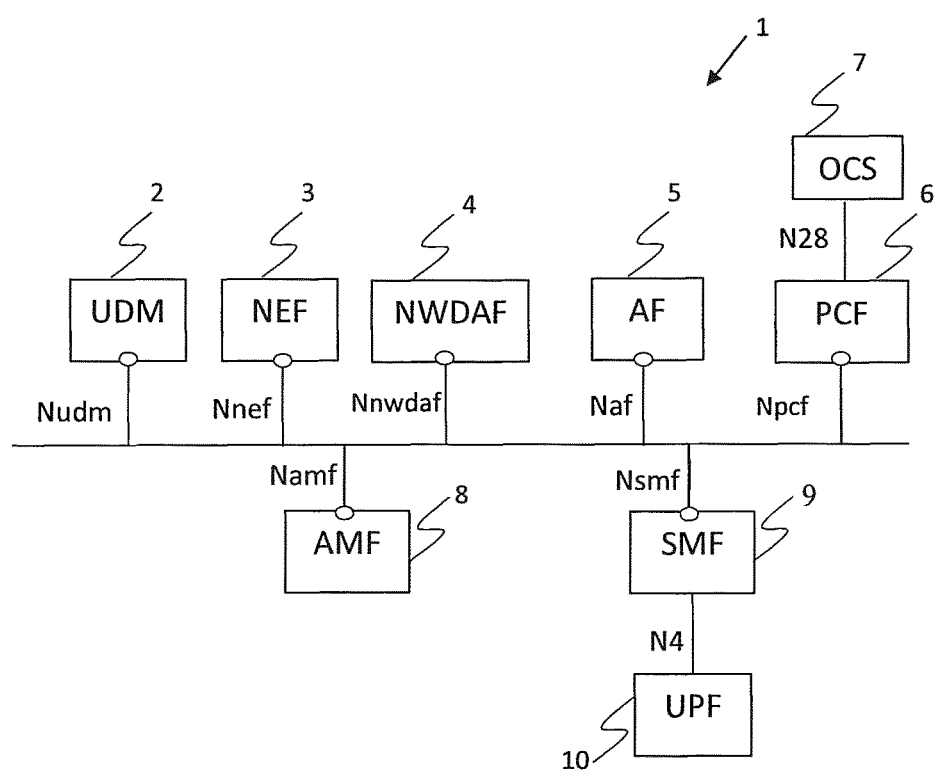
FIG. 1 schematically illustrates a part of the architecture of a Fifth Generation, 5G, telecommunication network.

FIG. 1 schematically illustrates part of the reference architecture 1 of a fifth generation, 5G, Service Based Architecture, SBA, telecommunication network, according to the prior art. The 5G system architecture comprise the following Network Functions, NFs:

Access and Mobility Management Function, AMF, 8
Network Exposure Function, NEF, 3
Policy Control Function, PCF, 6
Session Management Function, SMF, 9
Unified Data Management, UDM, 2
User Plane Function, UPF, 10
Application Function, AF, 5
Network Data Analytics Function, NWDAF, 4
Online Charging System, OCS, 7.

A functional description of these network functions is specified in clause 6 of the Third Generation Partnership Project, 3GPP, standard 23.501, "System Architecture for the 5G system", the contents of which are included herein, by reference.

FIG. 2 schematically illustrates a method 20 of reporting User Plane Function, UPF, 10, capabilities to a Session Management Function, SMF 9, according to the present disclosure. It is proposed to extend the existing mechanism to report UPF 10 capabilities in the form of a PFCP Association Setup Request message 21 with a new capability—metric measurements: metric. This would allow SMF 9 to know which UPFs 10 support this capability and thus can influence on UPF 10 selection. The SMF 9 sends 22 a PFCP Association Setup Response message to UPF 10.

FIG. 3 schematically illustrates a method 30 of reporting analytics according to the present disclosure. The method 30 represents a method of reporting analytics per PFCP session either on a PDR level or a PFCP session level. The steps of reporting analytics per PFCP session on a PDR level are first explained followed by reporting analytics per PFCP session on a PFCP session level.

Upon PDU session establishment, the SMF 9 sends 31 a PFCP Session Establishment Request message to UPF 10. This message may include a Packet Detection Rule, PDR as defined in PFCP standard, which includes the traffic filter that applies to the associated rules further mentioned below, a Forwarding Action Rule, FAR, a Usage Reporting Rule, URR, a QoS Enforcement Rule, QER and a Buffering Action Rule, BAR, as defined in the PFCP standard.

The message further includes an Analytics Reporting Rule, ARR. This rule, for example, defines traffic metrics that UPF 10 shall report to SMF 9. Each ARR includes an ARR-ID, identifying the ARR, a list of traffic metric IDs, which define the traffic metric that shall be reported to SMF 9. The UPF 10 and SMF 9 shall have a common understanding of the metric-IDs.

The message may further comprise a reporting trigger associated to each metric-ID, for example, specifying a periodic reporting or reporting upon reaching a threshold. In a subsequent step 32, the UPF 10 sends a PFCP Session Establishment Response message to SMF 9. In a further step 33, the session is established. Traffic traverses UPF 33 and it starts matching packets and executing ARRs when the packets match the corresponding PDR. When a certain metric reporting trigger is activated, the next steps 34, 35 take place for that metric.

In step 34, the UPF 10 sends to SMF 9, a PFCP Session Report Request including ARR-ID, indicating what ARR the report corresponds to, a metric-ID, indicating what metric is being reported and a metric value, including the value for that metric. In a final step 35, the SMF 9 sends a PFCP Session Report Response to UPF 10. The person skilled in the art understands that PFCP Session Modification Request will allow any updates on the session in relation to an ARR such as adding a new ARR, removing an existing one or even modifying and existing one.

Alternately, the method 3 shown in FIG. 3 may also refer to a method of reporting for analytics per PFCP session on a PFCP session level. The steps described below explain how this may be achieved. Upon PDU session establishment, SMF 9 sends 31 a PFCP Session Establishment Request message to UPF 10. This message comprises a Session Analytics Reporting Rule, SARR. This rule defines traffic metrics that UPF 10 shall report to SMF 9. Each SARR includes an SARR-ID, identifying the SARR, a list of traffic metric IDs, which define the traffic metric that shall be reported to SMF 9. It may be advantageous to consider that the UPF 10 and the SMF 9 shall have a common understanding of the metric-IDs The SARR may further comprise a reporting trigger associated to each metric-ID, which, for example, indicates if the reporting is to be periodic reporting or reporting upon reaching a threshold.

In a step 32, the UPF 10 sends a PFCP Session Establishment Response message to SMF 9. Subsequently, the PFCP session is established 33. Traffic traverses UPF 10 and it starts evaluating SARRs. When a certain metric reporting trigger is activated, the next steps 34, 35 take place for that metric. In step 34, the UPF 10 sends to SMF 9 a PFCP Session Report Request comprising an SARR-ID, indicating what SARR the report corresponds to a metric-ID, indicating what metric is being reported and the metric value, including the value for that metric.

In a final step 35, the SMF 9 sends a PFCP Session Report Response to UPF 10. It may be understood by the person skilled in the art that the PFCP Session Modification Request will allow any updates on the session in relation to a SARR, such as adding a new SARR, removing an existing one or even modifying and existing one. It is further understood that SARRs may be included along with ARRs in the same PFCP message.

FIG. 4 schematically illustrates a method 40 of reporting analytics according to the present disclosure. Method 40 addresses the reporting for analytics per UPF 10 node. In a first step, the SMF 9 sends 41 a Node Analytics Reporting Rule, NARR, Creation Request message to UPF. This message includes a traffic filter that applies to the associated NARR. This can be, for example, an IP 5-tuple. The message further comprises an NARR-ID, which allows UPF 10 and SMF 9 to identify the NARR and the Node Analytics Reporting Rule. This rule defines traffic metrics that UPF 10 shall report to SMF 9.

Each NARR includes a list of traffic metric IDs, which define the traffic metric that shall be reported to SMF 9. It may be advantageous to consider that the UPF 10 and SMF 9 shall have a common understanding of the metric-IDs. Each NARR further comprises a reporting trigger associated to each metric-ID indicating whether reporting is to be periodic reporting or reporting upon reaching a threshold, for example.

In step 42, the UPF 10 sends a NARR Creation Response message to SMF 9. Subsequently, traffic traverses 43 UPF 10 and it starts matching packets against the traffic filters and executing NARRs. This is done per node, i.e. all the node traffic traverses the traffic filters regardless the PFCP session it belongs to. When a certain metric reporting trigger is activated, the next steps 44, 45 take place for that metric.

In step 44, UPF 10 sends to SMF 9 a PFCP Node Report Request comprising a Node-ID, which identifies the UPF 10 node as defined in 3GPP Technical Specification, TS, 29.244, an NARR-ID, indicating the NARR that has been activated a metric-ID, indicating what metric is being reported and a metric value, including the value for that metric. In step 55, the SMF 9 sends a PFCP Node Report Response to UPF 10.

Apart from the NARR Creation Request message sent in step 41, other messages apply also to NARR. For example,
NARR Modification Request message, to modify an already created NARR. This message includes the same parameters than the creation message.
NARR Deletion Request message, to delete an existing NARR. This message shall include the NARR-ID as parameter.

Figure 5:
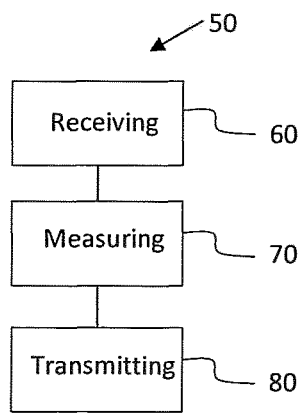
FIG. 5 schematically illustrates a method according to the present disclosure.

FIG. 5 schematically illustrates a method 50 according to the present disclosure. The method 50 comprises the steps of receiving 60, measuring, 70 and transmitting 80. In the step of receiving 60, the UPF 10 receives a session creation/modification message. The received session creation/modification message may further comprise a reporting trigger indicating a trigger for reporting measured traffic. The message may also comprise additional information such as an ARR, an SARR or an NARR.

In the step of measuring 70, the UPF measures the traffic pertaining to the metric received by the UPF 10 in the step of receiving 60. In a step of transmitting 80, the UPF transmits a reporting message comprising the measured traffic metric.

Figure 6:
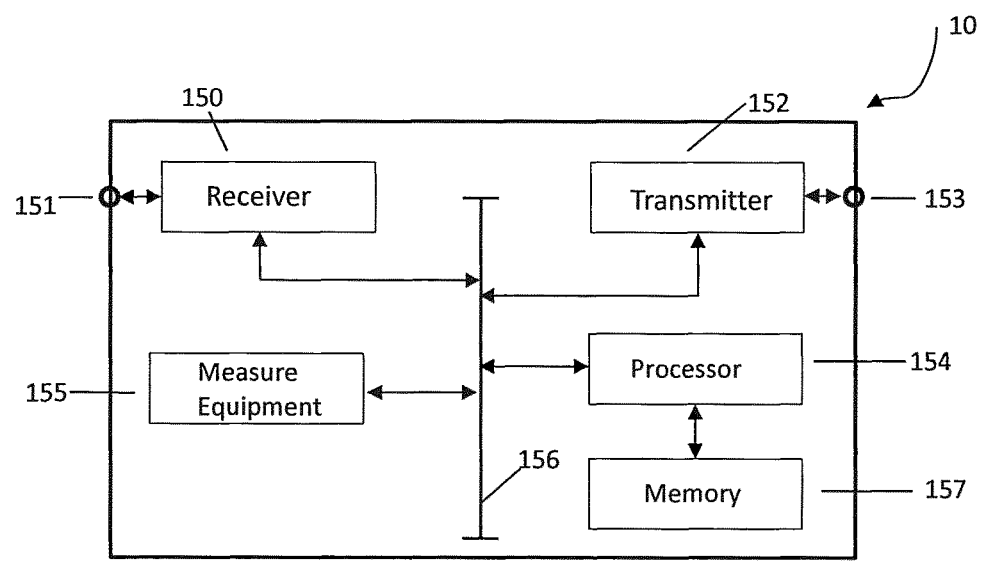
FIG. 6 schematically illustrates a node device according to the present disclosure.

FIG. 6 schematically illustrates a UPF 10 according to the present disclosure. The UPF 10 comprises a Receiver 150, 151 arranged to receive signals from other network elements in the telecommunication network and a transmitter 152, 153 arranged to transmit signals to other network elements in the telecommunication network. The person skilled in the art understands that the receiver 150, 151 and the transmitter 152, 153 may be implemented as a single entity—such as a transceiver—in the network.

The receiver 150, 151 is further arranged to receive a session creation/modification message as explained. The transmitter 152, 153 is further arranged to transmit a reporting message comprising a measured traffic metric. The UPF 10 further comprises measure equipment 155 which is arranged to measure the traffic based on the metric received by the UPF 10 in a session creation/modification message. The UPF 10 also comprises a memory 157 which is arranged to store any intermediate values and/or a computer program product which when executed by the processor 154 causes the UPF 10 to perform a method according to an aspect of the present disclosure. All the internal components of the UPF 10 communicate with one another using an internal bus 156.

Other variations to the disclosed examples can be understood and effected by those skilled in the art in practicing the claimed disclosure, from a study of the drawings, the disclosure and the appended claims. In the claims, the word "comprising" does not exclude other elements or steps and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage.

A computer program may be stored/distributed on a suitable medium, such as optical storage medium or a solid-state medium supplied together with or as part of other hardware, but may also be distributed in other forms, such as via the Internet or other wired or wireless telecommunication systems. Any reference signs in the claims should not be construed as limiting scope thereof.

The present disclosure is not limited to the examples as disclosed above, and can be modified and enhanced by those skilled in the art beyond the scope of the present disclosure as disclosed in the appended claims without having to apply inventive skills.

The invention claimed is:

1. A method of reporting traffic metrics by a User Plane Function, UPF, to a Session Management Function, SMF, in a telecommunication network, wherein said method comprises the steps of:
   receiving, by said UPF, a session creation/modification message for creating/modifying a session between said UPF and said SMF, wherein said message comprises a Reporting Rule thereby defining which traffic metric is to be reported by said UPF to said SMF, wherein said creation/modification message comprises any of:
      an Analytics Reporting Rule, ARR, for indicating traffic metric to be reported by said UPF on a Packet Detection Rule, PDR, level, wherein said ARR comprises a metric identification for identifying said traffic metric to be reported; and
      a Node Analytics Reporting Rule, NARR, for indicating traffic metric to be reported by said UPF on a node level, wherein said NARR comprises a metric identification for identifying said traffic metric to be reported;
   measuring, by said UPF, said traffic metric based on said received Reporting Rule; and
   transmitting, by said UPF, to said SMF, a reporting message, wherein said reporting message comprises: said measured traffic metric and any of:
      a reporting rule identification for identifying whether a reporting message is associated with one of said ARR, and NARR; and
      a traffic metric value for identifying a measured traffic value of said identified traffic metric;
   wherein said traffic metric is one of latency, jitter, or roundtrip time.

2. A method in accordance with claim 1, wherein said step of receiving comprises:
   receiving, by said UPF, said creation/modification message, wherein said message comprises a reporting trigger, wherein said reporting trigger indicates a trigger for reporting said measured traffic;
   and wherein said step of transmitting comprises:
   transmitting, by said UPF, to said SMF, said reporting message triggered by said reporting trigger.

3. A method in accordance with claim 1, wherein said method comprises the steps of:
   transmitting, by said UPF, to said SMF, a session association setup request message, wherein said session association setup request message comprises a traffic metric capability identification for identifying capability for reporting said traffic metric; and
   receiving, by said UPF, from said SMF, an acknowledgement message thereby acknowledging said session association setup request message.

4. A method in accordance with claim 1, wherein said session is a Packet Forwarding Control Protocol, PFCP, session.

5. A method in accordance with claim 1, wherein said UPF comprises an N4 interface.

6. A User Plane Function, UPF, arranged for reporting traffic metrics to a Session Management Function, SMF, in a telecommunication network, wherein said UPF comprises:
   receive equipment arranged for receiving a session creation/modification message for creating/modifying a session between said UPF and said SMF, wherein said message comprises a Reporting Rule thereby defining which traffic metric is to be reported by said UPF to said SMF, wherein said creation/modification message comprises any of:
      an Analytics Reporting Rule, ARR, for indicating traffic metric to be reported by said UPF on a Packet Detection Rule, PDR, level, wherein said ARR comprises a metric identification for identifying said traffic metric to be reported; and
      a Node Analytics Reporting Rule, NARR, for indicating traffic metric to be reported by said UPF on a node level, wherein said NARR comprises a metric identification for identifying said traffic metric to be reported
   measure equipment arranged for measuring said traffic metric based on said received Reporting Rule; and
   transmit equipment arranged for transmitting to said SMF, a reporting message, wherein said reporting message comprises said measured traffic metric and any of:
      a reporting rule identification for identifying whether a reporting message is associated with one of said ARR, and NARR; and
      a traffic metric value for identifying a measured traffic value of said identified traffic metric;
   wherein said traffic metric is one of latency, jitter, or roundtrip time.

7. A UPF in accordance with claim 6, wherein said receive equipment is further arranged for receiving said creation/modification message, wherein said message comprises a reporting trigger, wherein said reporting trigger indicates a trigger for reporting said measured traffic;
   and wherein said transmit equipment is further arranged for transmitting, to said SMF, said reporting message triggered by said reporting trigger.

8. A UPF in accordance with claim 6, wherein said transmit equipment is further arranged for transmitting, to said SMF, a session association setup request message, wherein said session association setup request message comprises a traffic metric capability identification for identifying capability for reporting said traffic metric,
   and wherein said receive equipment is further arranged for receiving, from said SMF, an acknowledgement message thereby acknowledging said session association setup request message.

9. A UPF in accordance with claim 6, wherein said session is a Packet Forwarding Control Protocol, PFCP, session.

10. A UPF in accordance with claim 6, wherein said UPF comprises an N4 interface.

11. A non-transitory computer readable medium storing instructions executable by a processor of a User Plane Function, UPF, for reporting traffic metrics to a Session Management Function, SMF, in a telecommunication network to thereby cause the UPF to:
   receive a session creation/modification message for creating/modifying a session between said UPF and said SMF, wherein said message comprises a Reporting Rule thereby defining which traffic metric is to be reported by said UPF to said SMF, wherein said creation/modification message comprises any of:
      an Analytics Reporting Rule, ARR, for indicating traffic metric to be reported by said UPF on a Packet Detection Rule, PDR, level, wherein said ARR comprises a metric identification for identifying said traffic metric to be reported; and
      a Node Analytics Reporting Rule, NARR, for indicating traffic metric to be reported by said UPF on a node level, wherein said NARR comprises a metric identification for identifying said traffic metric to be reported;
measure said traffic metric based on said received Reporting Rule; and
transmit, to said SMF, a reporting message, wherein said reporting message comprises: said measured traffic metric and any of:
a reporting rule identification for identifying whether a reporting message is associated with one of said ARR, and NARR; and
a traffic metric value for identifying a measured traffic value of said identified traffic metric;
wherein said traffic metric is one of latency, jitter, or roundtrip time.

* * * * *